United States Patent
Soldavini et al.

(10) Patent No.: US 6,829,999 B2
(45) Date of Patent: Dec. 14, 2004

(54) TOWING SYSTEM FOR SORTING MACHINES

(75) Inventors: Attilio Soldavini, Ferno Va (IT); Renato Tacchi, Lonate Pozzolo Va (IT)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/410,353

(22) Filed: Apr. 10, 2003

(65) Prior Publication Data

US 2003/0217909 A1 Nov. 27, 2003

(30) Foreign Application Priority Data

Apr. 12, 2002 (IT) ..................................... MI2002A0787

(51) Int. Cl.[7] .............................................. B61B 12/02
(52) U.S. Cl. ......................................... 104/96; 104/145
(58) Field of Search .......................... 104/96, 102, 140, 104/142, 145

(56) References Cited

U.S. PATENT DOCUMENTS

| | | |
|---|---|---|
| 2,575,914 A | 11/1951 | Griffin et al. |
| 4,399,904 A | 8/1983 | Canziani |
| 5,004,965 A * | 4/1991 | Otokawa et al. ............. 318/254 |
| 5,060,575 A * | 10/1991 | Hallett et al. .......... 104/130.07 |
| 5,803,230 A | 9/1998 | Canziani et al. |
| 6,367,610 B1 * | 4/2002 | Fortenbery et al. ..... 198/370.04 |

FOREIGN PATENT DOCUMENTS

GB    2 014 933    9/1979

* cited by examiner

Primary Examiner—S. Joseph Morano
Assistant Examiner—Robert J. McCarry, Jr.
(74) Attorney, Agent, or Firm—Burns, Doane, Swecker & Mathis, L.L.P.

(57) ABSTRACT

A device for towing a train of carriages of a sorting machine includes a pair of wheels driven by respective motors, which wheels engage a blade arranged below the carriages. Each towing wheel is movable toward and away from the blade relative to its respective motor, whereby the inertia of the member that has to be moved in response to a misalignment of the blade is low.

10 Claims, 3 Drawing Sheets

TOWING SYSTEM FOR SORTING MACHINES

This application claims priority under 35 U.S.C. §119 to Patent Application Serial No. MI 2002A 000787 filed in Italy on Apr. 12, 2002, the entire content of which is hereby incorporated by reference.

The present invention relates to a towing device to be used with sorting machines, for example of the "cross belt" type, for carriage towing. These machines can exhibit different layouts (linear, carousel-like, L-shaped, etc.) and they consist of a train of carriages moving along a sorting path, from item input stations to devices for collecting sorted items. See, for example, U.S. Pat. No. 5,803,230, the disclosure of which is incorporated herein by reference.

The term "Cross Belt" indicates that the sorting unit with which the carriage is equipped, is a small conveyor belt capable of moving independently, by an electric motor, in the two directions orthogonal to the running direction of the sorting machine.

According to a known method, carriages are propelled or towed by fixed driving wheels which, by friction, engage with a plate integral with said carriages. In the practice, each carriage is provided with a blade or plate arranged in vertical and longitudinal position below the same carriage and integral with it. Carriages are reciprocally interconnected by an articulated joint that allows them to cover curved and/or variable slope portions. The blades below them are fitted so as to obtain an optimum alignment.

Since the blades are not perfectly aligned, the wheels must be capable of following the small side movements of the blades, in turn making small movements transversely of their respective axes.

Such small movements, following an increase in speed of the sorting machines, are quite sudden and since they tend to make the wheels bounce, even though for a very short time, the wheels may slide, with a resulting loss of thrust to the disadvantage of the regularity of motion, but above all, with a resulting decrease of the life of the friction gaskets which cover the driving wheels. This also causes a certain noise.

SUMMARY OF THE INVENTION

The present invention intends to strongly reduce such disadvantages through a drafting device that, thanks to the low inertia of the moving equipment, is capable of promptly following the side movements of the blades. In particular, the invention relates to an apparatus for propelling a track-mounted carriage that has a vertically projecting blade. The apparatus comprises a pair of driving wheels forming therebetween a nip adapted to receive the blade, the wheels being driven by a motor arrangement and being movable toward and away from the nip independently of the motor arrangement in response to blade misalignments.

BRIEF DESCRIPTION OF DRAWINGS

The objects and advantages of the invention will become apparent from the following detailed description of a preferred embodiment thereof in connection with the accompanying drawing in which like numerals designate like elements, and in which.

DESCRIPTION OF A PREFERRED EMBODIMENT OF THE INVENTION

Figure 1:
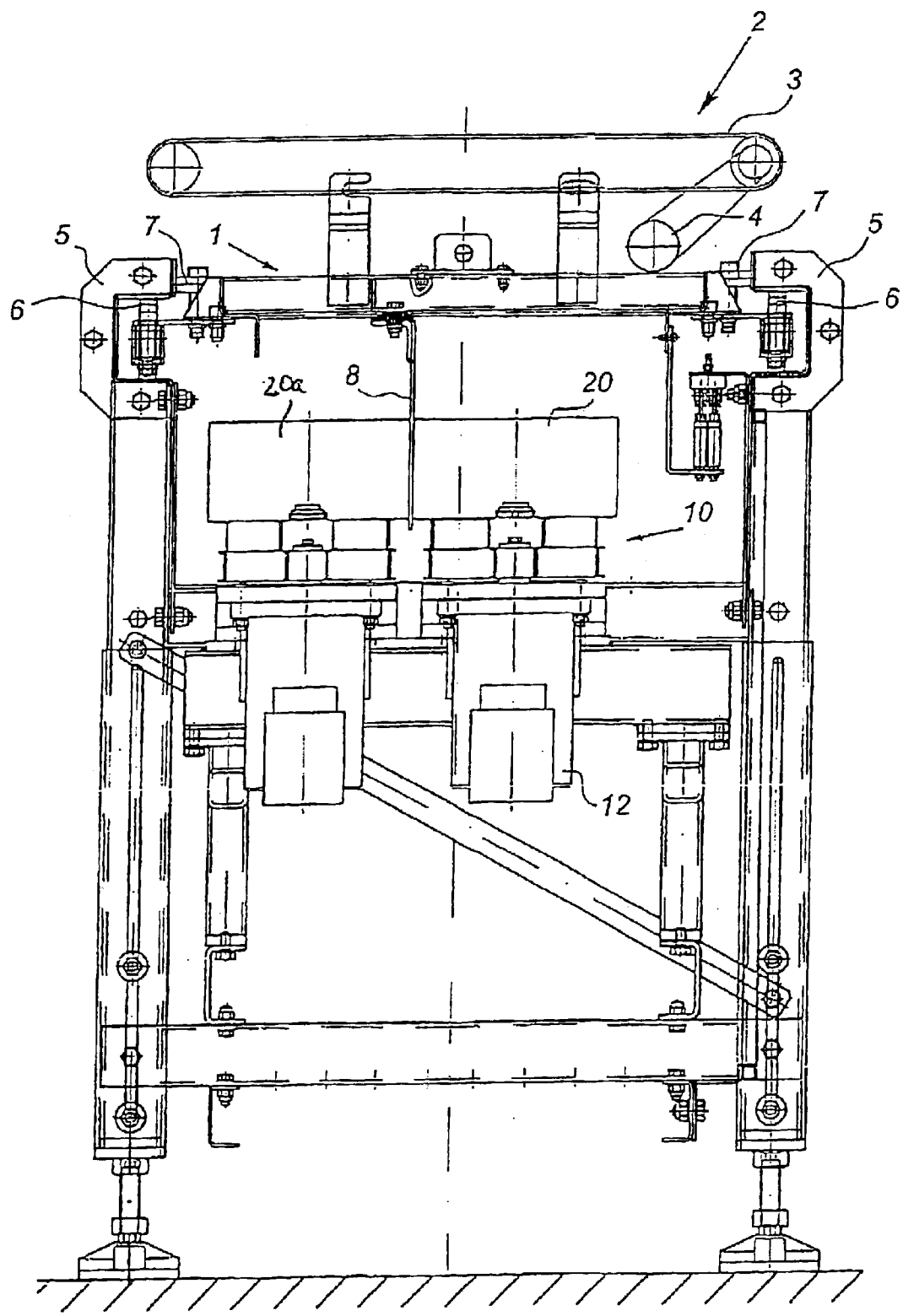
FIG. 1 shows a front elevational view of the carriage sliding track and the towing device.

With reference to FIG. 1, reference numeral (1) denotes a carriage onto which a loading-unloading device (2) is fitted, consisting of a moving belt (3) driven by a motor (4). The carriage is attached to other carriages (not shown) to form a train of carriages.

Said carriage (1) travels along a pair of rails (5) and is supported by a pair of rotary wheels (6) and by the preceding carriage (not shown). Moreover, the carriage is guided by a pair of wheels (7) having vertical axes, the wheels (7) being in side abutment against respective rails (5).

A blade (8) is mounted to each carriage and extends in the longitudinal direction, i.e., the running direction, and perpendicular to the plane of the same carriage. The length of said blades according to the running direction is such that the blades of two adjacent carriages are almost in mutual contact.

A device (10) acts on said blades with the function of exerting the pulling force required to make the train of carriages move forward.

Figure 2:
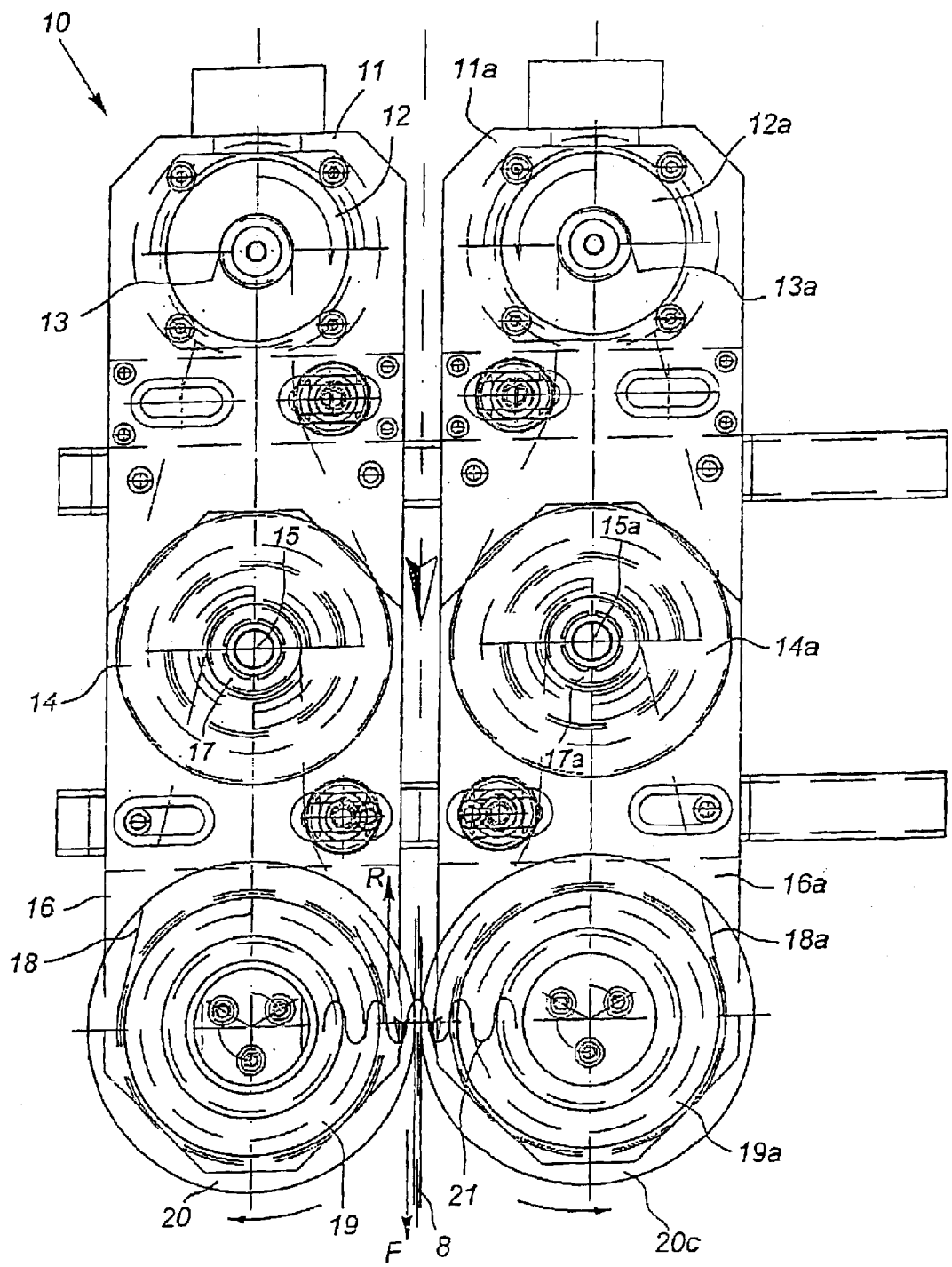
FIG. 2 shows a plan view of the towing device.
Figure 3:
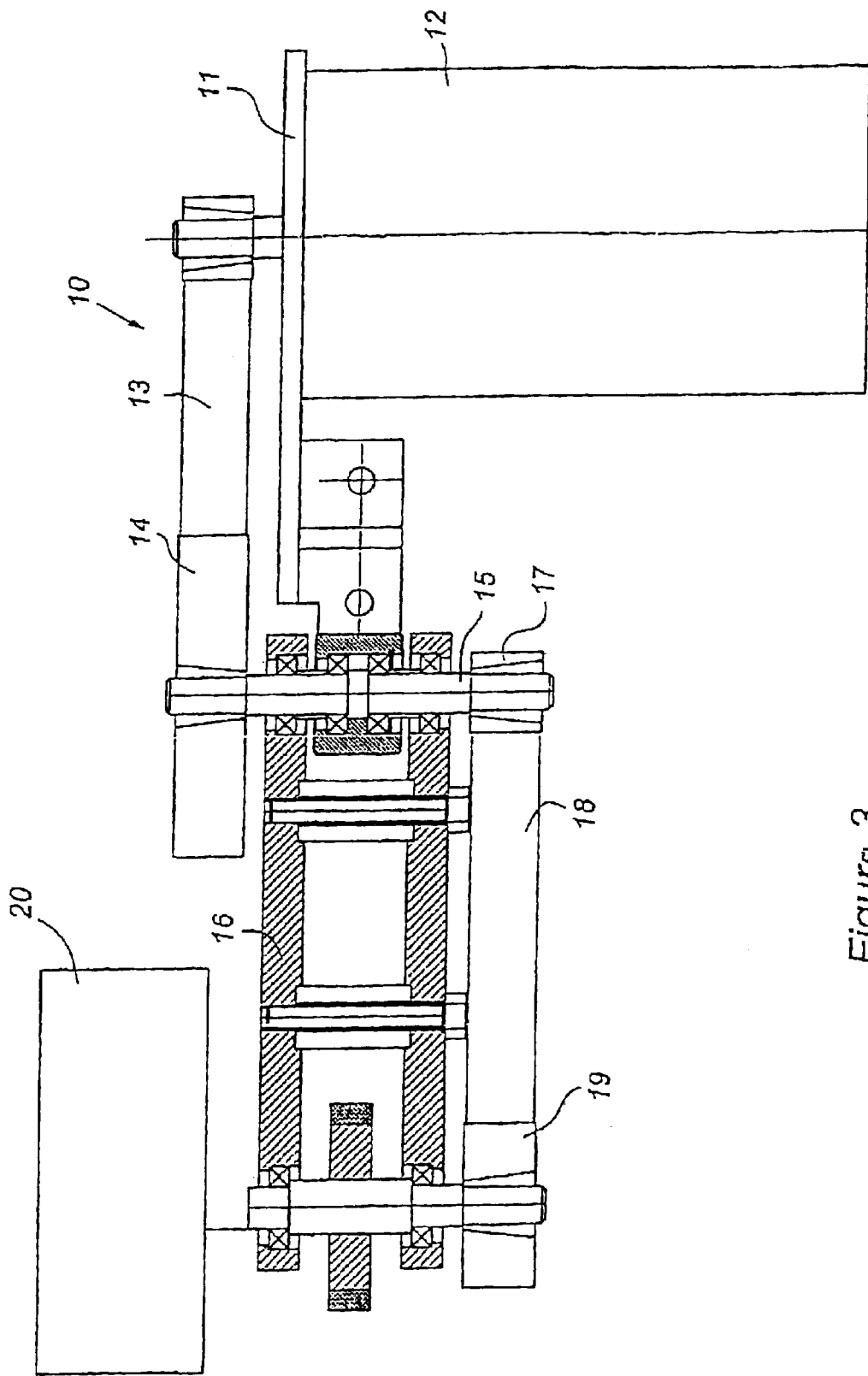
FIG. 3 shows an enlarged view of the towing device.

With reference to FIGS. 2 and 3, reference numerals (11) and (11a) denote two fixed supports onto which two motors (12) and (12a) are fitted, which by two belts (13) and (13a) drive two pulleys (14) and (14a). Said pulleys have small shafts (15) and (15a), onto which two mobile supports (16) and (16a) are fitted, said mobile supports (16) and (16a) being capable of freely oscillating relative to respective ones of said small shafts (15) and (15a) toward and away from the blade (8) by swinging about the axes of the shafts (15) and (15a), i.e., the wheels (20) and (20a) can, in their entirety, move to the right and left in FIG. 2.

Two pulleys (17) and (17a), each being coaxial and integral with respective pulleys (14) and (14a), drive two belts (18) and (18a) which drive two pulleys (19) and (19a), each being coaxial and integral with respective wheels (20) and (20a). Said wheels are kept pressed by elastic means (21) against said blade (8) located below each carriage. Said elastic means (21) can consist, for example, of a helical spring disposed below the blade (8) interconnecting the two wheels (20) and (20a), keeping them pressed against blade (8). Thus, the wheels form a nip through which the blade passes.

Compared to the prior art, the oscillating arms (16) and (16a) have been added to keep stationary the two motors (12) and (12a)—respectively fitted on the fixed supports (11) and (11a).

Since only the oscillating arms (16) and (16a) and the driving wheels (20) and (20a) are displaced due to blade misalignment, the inertia of the moving apparatus will be considerably less than that of the prior art. In fact, the motor arrangement defined by the two motors, which are the main part of the towing system, remain stationary, since only the driving wheels move as a consequence of misalignment of the blades, the movement being transversely of the respective axis.

In order to prevent any sliding of the driving wheels, it is necessary to restrain the torque delivered by the motors (12) and (12a) to a fixed value. Such object is achieved using direct current brushless motors (12) and (12a) with torque feedback intended to generate a torque on each driving wheel that is proportional to the command received. The use of a torque feedback brushless motors also allows distributing the torque to the drafting units, thereby preventing conflicts that would occur with speed feedback motors.

Besides the above advantages in using brushless motors, the device according to the invention allows a quicker adaptation of the drafting system to the blades (8), with less intense system inside stresses since such adaptation movements only concern the wheels (20) and (20a), whereas motors, with larger volume, remain stationary.

Also the noise of the drafting system and the risk of sliding are decreased as a consequence.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. Apparatus for propelling a track-mounted carriage that has a vertically projecting blade, comprising a pair of driving wheels forming therebetween a nip adapted to receive the blade, the driving wheels being driven about respective axes of rotation by a motor arrangement, each driving wheel, in its entirety, being freely displaceable transversely of the respective axes independently of the motor arrangement by a misaligned blade to enable the driving wheels to adapt to the misaligned blade.

2. The apparatus according to claim 1 further including respective support structures on which the driving wheels are mounted, the support structures being pivotable about respective pivot axes oriented substantially parallel to the axes of rotation.

3. The apparatus according to claim 2 further including a power transmission mechanism from the motor arrangement to the driving wheels, including power transmitting members mounted for rotation about respective ones of the axes.

4. The apparatus according to claim 3 wherein each of the power transmission members comprises a pulley mounted for rotation on a respective shaft defining a respective one of the axes, and belts extending around respective ones of the pulleys and operably connected to respective ones of the driving wheels.

5. The apparatus according to claim 4 wherein the pulleys comprise first pulleys; the motor arrangement comprising two respective motors; the apparatus further including two second pulleys mounted on respective ones of the shafts, and belts connecting the second pulleys to respective ones of the motors.

6. The apparatus according to claim 1 further including an elastic structure urging the support structures in respective directions for biasing the driving wheels toward the nip.

7. The apparatus according to claim 6 wherein the elastic structure comprises a coil spring interconnecting the support structures.

8. The apparatus according to claim 1 wherein the motor arrangement comprises two motors for driving respective driving wheels.

9. The apparatus according to claim 1 wherein the motors comprise torque feedback brushless motors.

10. A sorting system comprising a track, a carriage movable along the track, and a propelling apparatus for advancing the carriage; a blade projecting downwardly from the carriage; the propelling apparatus comprising a pair of driving wheels forming therebetween a nip through which the blade passes, the wheels being driven about respective axes of rotation by respective motors, each driving wheel, in its entirety, being freely displaceable transversely of the respective axes independently of the track and the respective motors by a misaligned blade to enable the driving wheels to adapt to the misaligned blade.

* * * * *